US 9,094,562 B2

(12) United States Patent
Horiguchi et al.

(10) Patent No.: US 9,094,562 B2
(45) Date of Patent: Jul. 28, 2015

(54) IMAGE SENSOR UNIT AND IMAGE READING APPARATUS USING THE IMAGE SENSOR UNIT

(75) Inventors: Tomoyuki Horiguchi, Saitama (JP); Hidemasa Yoshida, Saitama (JP); Akifumi Fujiwara, Saitama (JP); Hidehisa Takahashi, Saitama (JP)

(73) Assignee: CANON COMPONENTS, INC. (JP)

( * ) Notice: Subject to any disclaimer, the term of this patent is extended or adjusted under 35 U.S.C. 154(b) by 0 days.

(21) Appl. No.: 14/237,752

(22) PCT Filed: Aug. 9, 2012

(86) PCT No.: PCT/JP2012/070315
§ 371 (c)(1),
(2), (4) Date: May 12, 2014

(87) PCT Pub. No.: WO2013/022060
PCT Pub. Date: Feb. 14, 2013

(65) Prior Publication Data
US 2014/0320937 A1  Oct. 30, 2014

(30) Foreign Application Priority Data

Aug. 9, 2011  (JP) .................................. 2011-174385
May 10, 2012  (JP) .................................. 2012-108400

(51) Int. Cl.
*H04N 1/04*  (2006.01)
*H04N 1/028*  (2006.01)
(Continued)

(52) U.S. Cl.
CPC ......... *H04N 1/02815* (2013.01); *G03G 21/046* (2013.01); *H04N 1/02825* (2013.01);
(Continued)

(58) Field of Classification Search
CPC .......... H04N 1/02815; H04N 1/02835; H04N 1/028; H04N 1/193; H04N 1/02885
See application file for complete search history.

(56) References Cited

U.S. PATENT DOCUMENTS 6,469,808 B1 * 10/2002 Onishi et al. .................. 358/475
7,140,762 B2 * 11/2006 Wu et al. ....................... 362/610
(Continued)

FOREIGN PATENT DOCUMENTS

JP   2002185708 A   6/2002
JP   2002262026 A   9/2002
(Continued)

OTHER PUBLICATIONS

International Preliminary Search Report issued in application No. PCT/JP2012/070315, dated Feb. 20, 2014.
(Continued)

*Primary Examiner* — Cheukfan Lee
(74) *Attorney, Agent, or Firm* — Rossi, Kimms & McDowell LLP

(57) ABSTRACT

A reflection reading light guide that emits light of a reflection reading light source, from a reflected light emission surface to bill S; a transmission reading light guide that emits light of a transmission reading light source, from a transmitted light emission surface to bill S; a rod-lens array that focuses reflected light from the bill S and/or transmitted light transmitted through bill S; a light receiving element that receives light collected by the rod-lens array; and a frame including a housing portion that houses the reflection reading light guide are disclosed. A light blocking portion that protrudes from the reflected light emission surface of the reflection reading light guide toward optical axis Z of the rod-lens array is included in the housing portion, and includes a positioning reference surface for the reflection reading light guide. Influence of stray light is reduced, and accuracy of read image is improved.

10 Claims, 8 Drawing Sheets

(51) Int. Cl.
*H04N 1/031* (2006.01)
*G03G 21/04* (2006.01)
*G03B 27/54* (2006.01)

(52) U.S. Cl.
CPC ....... *H04N1/02835* (2013.01); *H04N 1/02855* (2013.01); *H04N 1/02865* (2013.01); *H04N 1/0312* (2013.01); *H04N 1/0315* (2013.01); *G03B 27/54* (2013.01); *H04N 2201/02456* (2013.01); *H04N 2201/02458* (2013.01); *H04N 2201/02462* (2013.01); *H04N 2201/03112* (2013.01); *H04N 2201/03125* (2013.01); *H04N 2201/03141* (2013.01); *H04N 2201/03145* (2013.01)

(56) References Cited

U.S. PATENT DOCUMENTS

| | | | | |
|---|---|---|---|---|
| 7,859,726 | B2* | 12/2010 | Endo et al. | 358/474 |
| 2005/0180159 | A1 | 8/2005 | Wu et al. | |
| 2007/0133858 | A1* | 6/2007 | Endo et al. | 382/137 |
| 2012/0154877 | A1* | 6/2012 | Kisara et al. | 358/474 |
| 2012/0320436 | A1* | 12/2012 | Tsumekawa et al. | 358/475 |
| 2013/0009037 | A1* | 1/2013 | Takahashi | 250/208.1 |
| 2013/0038912 | A1* | 2/2013 | Horiguchi et al. | 358/474 |
| 2013/0038913 | A1* | 2/2013 | Shimoda et al. | 358/474 |
| 2013/0038914 | A1* | 2/2013 | Yoshida et al. | 358/474 |
| 2013/0100508 | A1* | 4/2013 | Shimoda | 358/509 |
| 2013/0265618 | A1* | 10/2013 | Kobayashi | 358/475 |

FOREIGN PATENT DOCUMENTS

| | | |
|---|---|---|
| JP | 2003060854 A | 2/2003 |
| JP | 2005086391 A | 3/2005 |
| JP | 2005236940 A | 9/2005 |
| JP | 2007116590 A | 5/2007 |
| JP | 2010098659 A | 4/2010 |
| JP | 2011082969 A | 4/2011 |

OTHER PUBLICATIONS

International Search Report—PCT/JP2012/070315—Dated Sep. 11, 2012.

* cited by examiner

IMAGE SENSOR UNIT AND IMAGE READING APPARATUS USING THE IMAGE SENSOR UNIT

TECHNICAL FIELD

The present invention relates to an image sensor unit used in an image reading apparatus, such as a copying machine, an image scanner, and a facsimile, and to an image reading apparatus using the image sensor unit. Particularly, the present invention relates to an image reading apparatus that authenticates a recording medium, such as bills and securities.

BACKGROUND ART

In image reading apparatuses that particularly authenticate bills and the like including the image reading apparatus of this type, an image reading apparatus described in Patent Literature 1 is known, for example.

CITATION LIST

Patent Literature

Patent Literature 1: Japanese Laid-open Patent Publication No. 2007-116590

SUMMARY OF THE INVENTION

Technical Problem

However, in a state without an original during reflection reading (for example, a gap between bills when the bills are consecutively read or a damaged part such as a scratch and a tear) in the conventional technique disclosed in Patent Literature 1, the light emitted from a reflection reading light source is incident on a transmission reading light guide disposed on the opposite side of the original and is reflected again. The light is emitted again, and this may cause stray light. A similar situation arises when the light transmits through a watermark when the watermark is read. The stray light (re-illumination light described later) becomes a noise component in the output of an image sensor unit, and the difference between the output (signal component) when there is an original and the noise component caused by the stray light becomes small. The contrast becomes obscure, causing a problem such as a reduction in the accuracy of a read image.

In view of the circumstances, an object of the present invention is to provide an image sensor unit and an image reading apparatus that can improve accuracy of a read image by reducing influence of stray light.

Solution to Problem

The present invention provides an image sensor unit that emits light to an object to be illuminated and that reads reflected light from the object to be illuminated and/or transmitted light transmitted through the object to be illuminated, the image sensor unit including: a reflection reading light guide that emits light of a reflection reading light source, from a reflected light emission surface to the object to be illuminated; a transmission reading light guide that emits light of a transmission reading light source, from a transmitted light emission surface to the object to be illuminated; an imaging element that focuses the reflected light from the object to be illuminated and/or the transmitted light transmitted through the object to be illuminated; a light receiving element that receives the light from the imaging element; and a frame including a housing portion that can house the reflection reading light guide, wherein a light blocking portion protruding toward an optical axis of the imaging element is included in part of the housing portion to cover part of the reflected light emission surface of the reflection reading light guide, and the light blocking portion includes a positioning reference surface for the reflection reading light guide.

The present invention provides an image reading apparatus including an image sensor unit that emits light to an object to be illuminated and that reads reflected light from the object to be illuminated and/or transmitted light transmitted through the object to be illuminated, the image sensor unit including: a reflection reading light guide that emits light of a reflection reading light source, from a reflected light emission surface to the object to be illuminated; a transmission reading light guide that emits light of a transmission reading light source, from a transmitted light emission surface to the object to be illuminated; an imaging element that focuses the reflected light from the object to be illuminated and/or the transmitted light transmitted through the object to be illuminated; a light receiving element that receives the light from the imaging element; and a frame including a housing portion that can house the reflection reading light guide, wherein a light blocking portion protruding toward an optical axis of the imaging element is included in part of the housing portion to cover part of the reflected light emission surface of the reflection reading light guide, the light blocking portion includes a positioning reference surface for the reflection reading light guide, and the image sensor unit reads an image of the object to be illuminated while the object to be illuminated and the image sensor unit are relatively moved.

Advantageous Effects of Invention

According to the present invention, part of the housing portion is a light blocking portion of the reflection reading light guide, and the emission range of the light from the reflection reading light guide is narrowed down. This can reduce the light incident on the transmission reading light guide. As a result, the stray light (re-illumination light) can be reduced. The contrast between the object to be illuminated as an object to be read and the background can be sharpened without increasing the number of components, and high reading accuracy can be secured.

The frame is divided into two parts, and the reflection reading light guide can be inserted from below. This can improve the assembly performance.

The light blocking portion serves as a positioning reference surface of the reflection reading light guide. This can improve the positioning performance during assembly without increasing the number of components.

DESCRIPTION OF EMBODIMENTS

Hereinafter, embodiments of an image sensor unit and an image reading apparatus of the present invention will be described with reference to the drawings.

Figure 1:
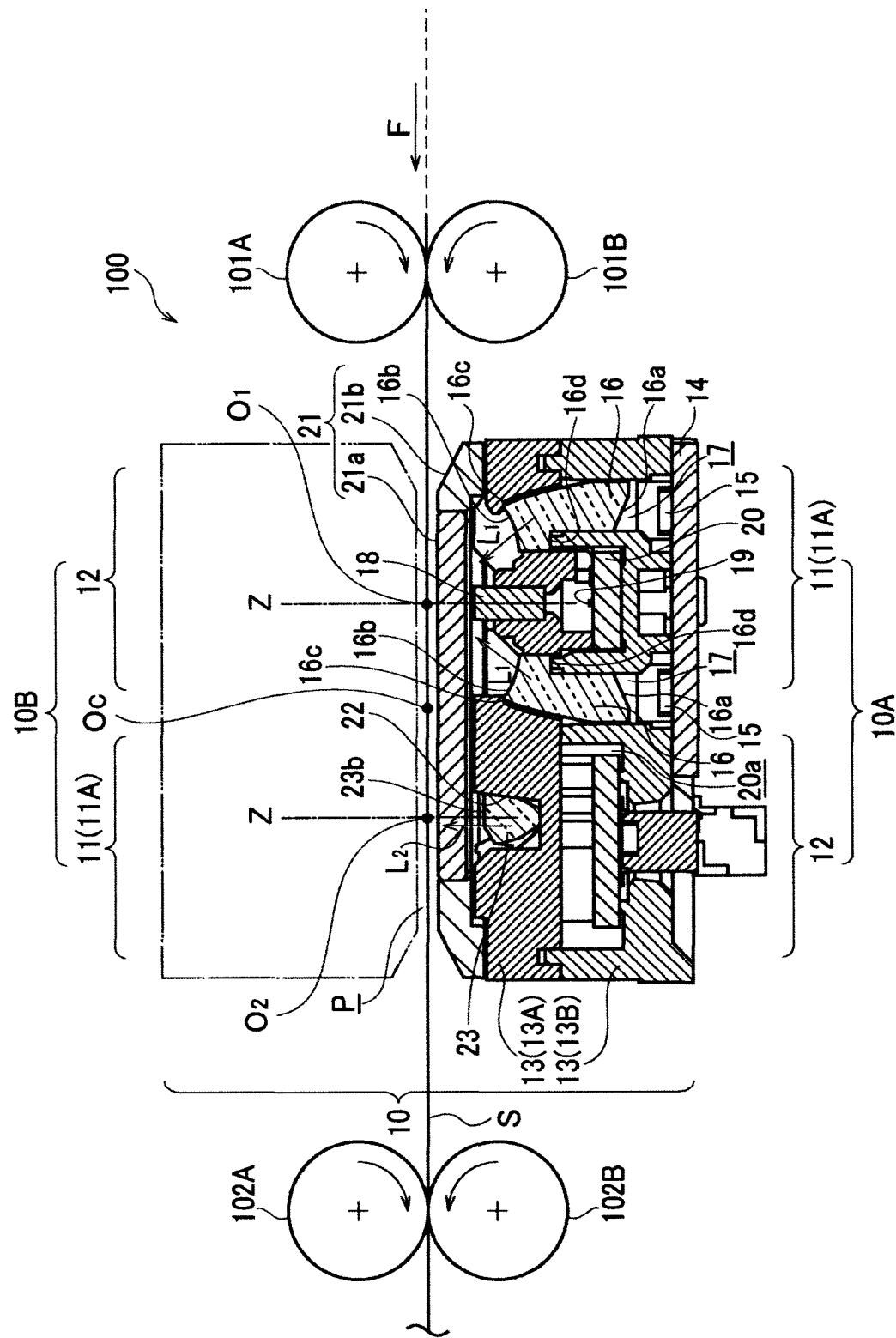
FIG. 1 is a sectional view illustrating a configuration of essential parts of an image reading apparatus including an image sensor unit according to the present invention.

FIG. 1 is a sectional view illustrating a configuration of essential parts of an image reading apparatus 100 including an image sensor unit 10 according to the present invention. First, the entire configuration will be schematically described. In the present embodiments, a typical object to be illuminated is a bill S. The object is not limited to the bill S, and the present invention can be applied to other objects.

At a predetermined section of the image reading apparatus 100, pairs of conveyor rollers 101A and 101B and conveyor rollers 102A and 102B for sandwiching and conveying the bill S are disposed at predetermined intervals in a conveyance direction F of the bill S. The conveyor rollers 101A, 101B, 102A, and 102B are rotated and driven by a driving mechanism, and the bill S is moved in the conveyance direction F relative to the image sensor unit 10, at a predetermined conveyance speed.

The image sensor unit 10 is disposed to have a gap between the conveyor rollers 101A, 101B and the conveyor rollers 102A, 102B to form a conveyance path P that allows the bill S to pass (in the present embodiments, the width of the conveyance path P=2.0 mm), and an image of the conveyed bill S is read. Across the conveyance path P of the bill S, the image sensor unit 10 includes an image sensor unit portion 10A on the lower side (hereinafter, called "lower image sensor unit portion 10A") and an image sensor unit portion 10B on the upper side (hereinafter, called "upper image sensor unit portion 10B"). In the present embodiments, the lower image sensor unit portion 10A and the upper image sensor unit portion 10B have the same configuration, symmetric about a center line Oc illustrated in FIG. 1. Each of the lower image sensor unit portion 10A and the upper image sensor unit portion 10B includes: an image reading portion 11 that reads an image, the image reading portion 11 including a reflection reading illumination portion 11A that emits reflection reading light to the bill S; and a transmission reading illumination portion 12 that emits transmission reading light to the bill S.

The image reading portion 11 (reflection reading illumination portion 11A) and the transmission reading illumination portion 12 allow reading the bill S based on reflected light and transmitted light. The transmission reading illumination portion 12 of the upper image sensor unit portion 10B is disposed corresponding to the image reading portion 11 of the lower image sensor unit portion 10A. The image reading portion 11 of the upper image sensor unit portion 10B is disposed corresponding to the transmission reading illumination portion 12 of the lower image sensor unit portion 10A. Therefore, the lower image sensor unit portion 10A and the upper image sensor unit portion 10B can read both sides of the bill S in one conveyance in the present embodiments.

The image sensor unit 10 may include the transmission reading illumination portion 12 on the opposite side of the image reading portion 11 (reflection reading illumination portion 11A) across the bill S, and the image sensor unit 10 may be disposed at a predetermined interval in the conveyance direction F of the bill S.

Figure 2A:
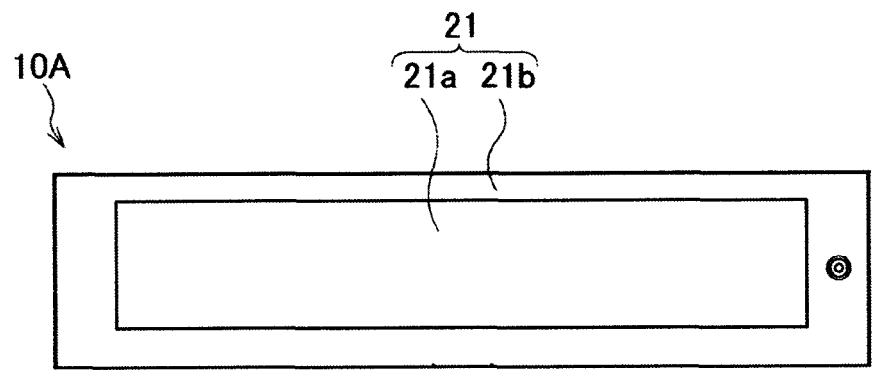
FIG. 2A is a top view illustrating an appearance of a lower image sensor unit portion according to the present invention.
Figure 2B:
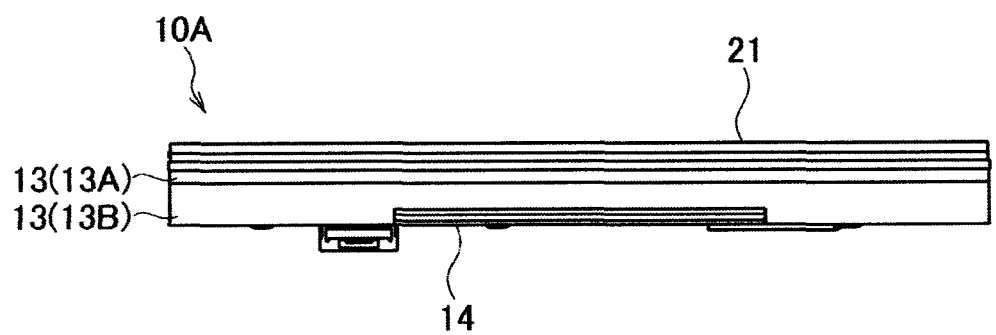
FIG. 2B is a front view illustrating an appearance of the lower image sensor unit portion according to the present invention.
Figure 2C:
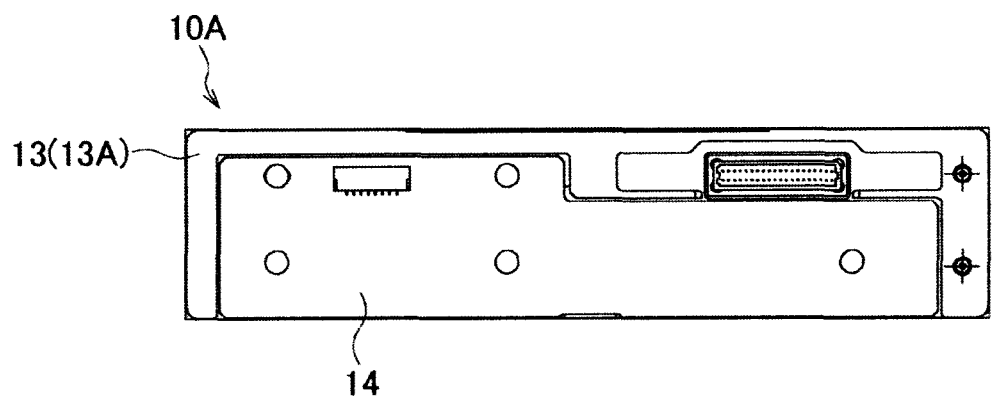
FIG. 2C is a bottom view illustrating an appearance of the lower image sensor unit portion according to the present invention.

Of the lower image sensor unit portion 10A and the upper image sensor unit portion 10B, the lower image sensor unit portion 10A will be described here. FIG. 2A is a top view illustrating an appearance of the lower image sensor unit portion 10A. FIG. 2B is a front view illustrating an appearance of the lower image sensor unit portion 10A. FIG. 2C is a bottom view illustrating an appearance of the lower image sensor unit portion 10A. The lower image sensor unit portion 10A generally has a rectangular shape. The longitudinal direction is the main-scan direction, and the sub-scan direction orthogonal to the main-scan direction is the conveyance direction F of the bill S.

Reference numeral 13 denotes a frame that is a member serving as a housing, and the frame is divided into an upper frame 13A and a lower frame 13B.

Reference numeral 14 denotes a substrate disposed on the bottom of the lower frame 13B, and a reflection reading light source 15 including a plurality of light emitting elements arranged in the main-scan direction is mounted. The reflection reading light source 15 includes light emitting elements formed by, for example, LEDs that emit light at wavelengths of red, green, blue, infrared, and ultraviolet (hereinafter, abbreviated as RGB, IR, and UV).

Figure 3A:
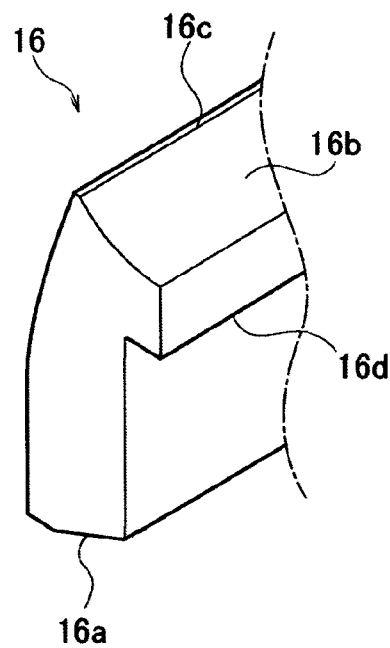
FIG. 3A is a perspective view illustrating a configuration of a reflection reading light guide and is a view from the side of a reflected light emission surface according to the present invention.
Figure 3B:
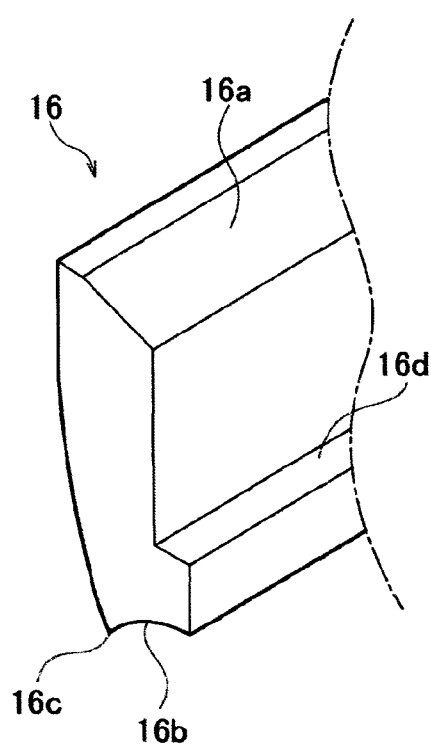
FIG. 3B is a perspective view illustrating a configuration of the reflection reading light guide and is a view from the side of an incident surface according to the present invention.

Reference numeral 16 denotes a reflection reading light guide elongated in the main-scan direction that guides light emitted from the reflection reading light source 15 to a reading position (reading line) $O_1$ of one of the surfaces (lower surface) of the bill S. The reflection reading light guide 16 is made of a transparent material, such as an acrylic resin and polycarbonate. A bottom surface of the reflection reading light guide 16 is an incident surface 16a that receives light of the reflection reading light source 15, and a top surface is a reflected light emission surface 16b that emits the light propagated inside. The reflected light emission surface 16b has a form concave toward the bill S so as to have a diffusion effect, for example. The parts other than the incident surface 16a and the reflected light emission surface 16b of the reflection reading light guide 16 are substantially formed as reflection surfaces. In addition, a first locking surface 16c and a second locking surface 16d are formed on the reflection reading light guide 16. As illustrated in FIGS. 3A and 3B, the first locking surface 16c is a surface facing upward and is formed on, for example, the upper end of the reflection reading light guide 16. The second locking surface 16d is a surface facing downward and is formed to oppose the first locking surface 16c, below the reflected light emission surface 16b, for example.

Reference numeral 17 denotes a housing portion including an opening formed substantially in the vertical direction from the bottom surface of the frame 13. The housing portion 17 is formed above the reflection reading light source 15, and the reflection reading light guide 16 can be housed. The first locking surface 16c and the second locking surface 16d are abutted with a reference surface 26 and a stepped portion 28 described later, respectively, and the reflection reading light guide 16 is attached in the housing portion 17, with the reflected light emission surface 16b being directed to the bill S.

Reference numeral 18 denotes a rod-lens array as an imaging element, and for example, a plurality of rod lenses of an erect equal magnification imaging type are arranged in a line in the main-scan direction. Reference numeral 19 denotes a light receiving element including a photoelectric conversion element that converts light to an electric signal. Reference numeral 20 is a sensor substrate provided with the light receiving element 19. The sensor substrate 20 is provided with a plurality of light receiving elements 19 arranged in the main-scan direction, and the light receiving elements 19 are disposed to substantially coincide with an optical axis Z of the rod-lens array 18. In this way, reflected light (or transmitted light) from the bill S is focused on the light receiving elements 19. A passage hole 20a for inserting the reflection reading light guide 16 is formed on the sensor substrate 20. The sensor substrate 20 is fixed to the bottom of the upper frame 13A by caulking or the like. The upper part of the upper frame 13A is covered by a transparent cover 21. The cover 21 includes: a cover main body 21a formed by transparent glass or the like; and an outer frame 21b that holds the cover main body 21a. The outer frame 21b is colored in black or the like to prevent transmission of light. The imaging element is not limited to the rod-lens array 18, but may be a micro-lens array, for example.

Figure 4:
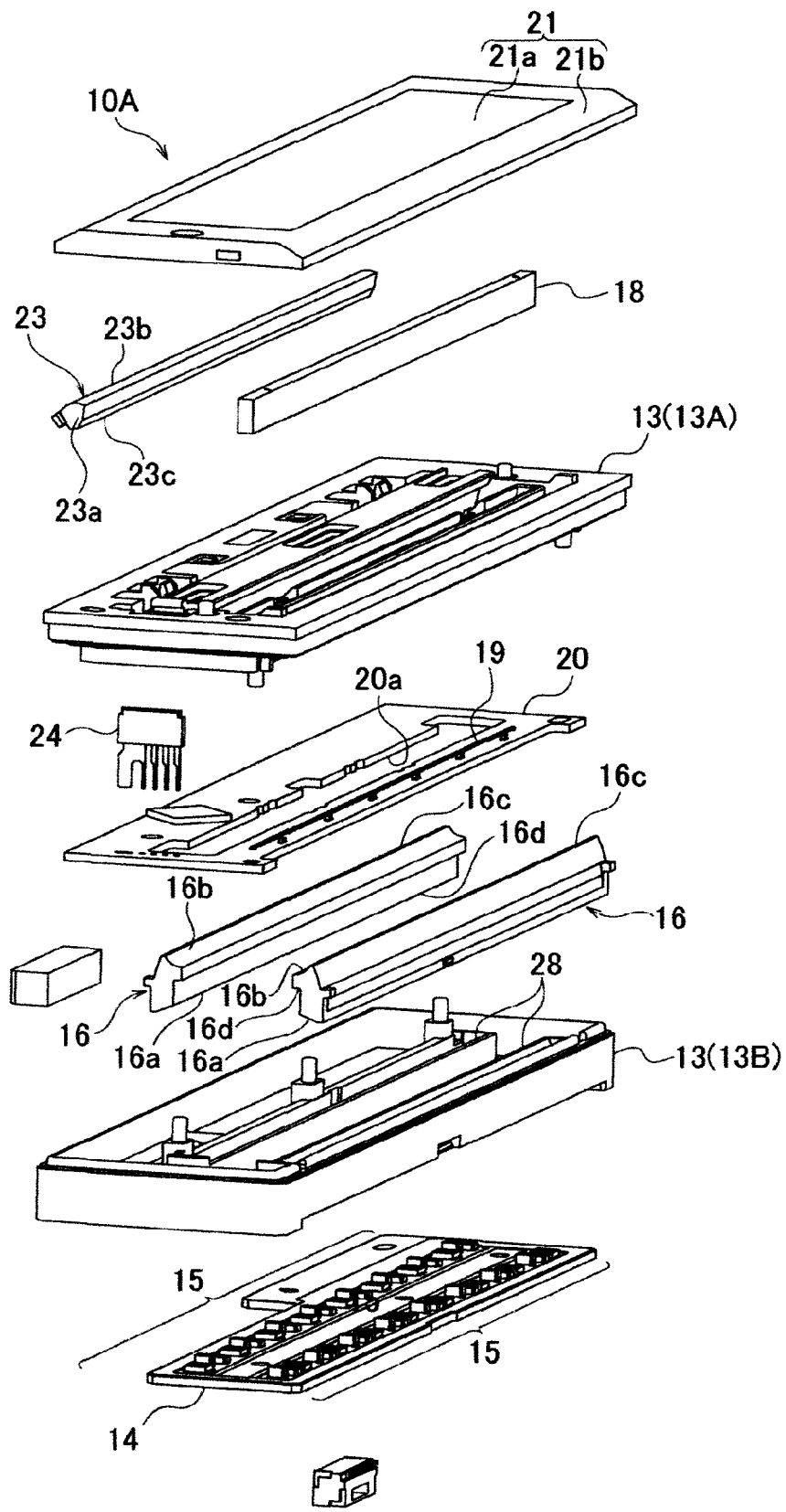
FIG. 4 is an exploded perspective view illustrating a configuration example of the lower image sensor unit portion according to the present invention.

As illustrated in FIG. 4, members, such as the reflection reading light guide 16, the rod-lens array 18, and the sensor substrate 20, are positioned and fitted inside of the frame 13. In the present embodiments, the reflection reading illumination portion 11A includes a pair of the reflection reading light source 15 and the reflection reading light guide 16 disposed across the optical axis Z of the rod-lens array 18. The image reading portion 11 includes the reflection reading illumination portion 11A.

Basic operation of the image reading portion 11 with the configuration described above will be described. The image reading portion 11 successively activates the RGB, IR, and UV light emitting elements of the reflection reading light source 15 to cause the reflection reading light source 15 to emit light to the bill S conveyed by the conveyor rollers 101A, 101B, 102A, and 102B in the conveyance direction F at a predetermined conveyance speed. The light emitted from the reflection reading light source 15 enters the reflection reading light guide 16 from the incident surface 16a. The incident light is reflected in the reflection reading light guide 16, or more specifically, the incident light propagates through the reflection reading light guide 16 while being completely reflected by the reflection surface of the reflection reading light guide 16. The light is directed to a reading position $O_1$ of the bill S and is emitted from the reflected light emission surface 16b as representatively indicated by an arrow $L_1$ in FIG. 1. The emitted light is uniformed directed, in a line in the main-scan direction, to one of the surfaces (lower surface) of the bill S from two directions across the rod-lens array 18.

The emitted light is reflected by the bill S and focused on the light receiving element 19 through the rod-lens array 18. The focused reflected light is converted to an electric signal by the light receiving element 19 and is processed by a signal processing portion not illustrated.

In this way, the reflected light of all of the RGB, IR, and UV is read for one scan line, and the reading operation of one scan line in the main-scan direction of the bill S is completed. After the reading operation of one scan line is finished, reading operation of the next one scan line is performed as described above, along with the movement of the bill S in the sub-scan direction. The reading operation of one scan line is repeated while the bill S is conveyed in the conveyance direction F. The entire surface of the bill S is successively scanned, and image information is read based on the reflected light.

The image reading portion 11 of the upper image sensor unit portion 10B performs the same operation for the other surface (upper surface).

Reference numeral 22 denotes a housing portion including an opening formed in the upper frame 13A. Reference numeral 23 denotes a transmission reading light guide elongated in the main-scan direction. The transmission reading light guide 23 is adjacent to the reflection reading light guide 16 in the sub-scan direction and fitted inside of the housing portion 22. A transparent material, such as an acrylic resin and polycarbonate, is used to form the transmission reading light guide 23 in a shape elongated in the main-scan direction.

One of the end surfaces of the transmission reading light guide 23 in the longitudinal direction is an incident surface 23a that receives light of the transmission reading light source 24. The top surface of the transmission reading light guide 23 is a transmitted light emission surface 23b that emits the light propagated inside, and the surface facing the transmitted light emission surface 23b is a diffusing surface 23c (see FIG. 4). The transmitted light emission surface 23b has a convex shape toward the bill S so as to have a light collecting effect, for example. The transmission reading light guide 23 is attached to the upper frame 13A, with the transmitted light emission surface 23b being directed to the bill S. A light diffusing pattern made of, for example, light reflective paint based on silk screen printing or the like is formed on the diffusing surface 23c. The parts other than the incident surface 23a, the transmitted light emission surface 23b, and the diffusing surface 23c are substantially formed as reflection surfaces.

Reference numeral 24 denotes a transmission reading light source including light emitting elements formed by, for example, LEDs that emit light at wavelengths of red, green, blue, infrared, and ultraviolet (hereinafter, abbreviated as RGB, IR, and UV). The transmission reading light source 24 is disposed near one of the end surfaces of the transmission reading light guide 23 in the longitudinal direction.

The transmission reading light source 24 and the transmission reading light guide 23 form the transmission reading illumination portion 12 in the present embodiments.

In the case of the transmission reading illumination portion 12 arranged on the lower image sensor unit portion 10A, the light receiving element 19 receives the light transmitted through the bill S, through the rod-lens array 18 of the upper image sensor unit portion 10B. The rod-lens array 18 and the light receiving element 19 are equivalent to the rod-lens array 18 and the light receiving element 19 of the lower image sensor unit portion 10A.

In the case of the transmission reading illumination portion 12 arranged on the upper image sensor unit portion 10B, the light receiving element 19 receives the light transmitted through the bill S, through the rod-lens array 18 of the lower image sensor unit portion 10A.

Operation of the transmission reading illumination portion 12 with the configuration described above will be described. The transmission reading illumination portion 12 successively activates the RGB, IR, and UV light emitting elements of the transmission reading light source 24 to cause the transmission reading light source 24 to emit light to the bill S conveyed by the conveyor rollers 101A, 101B, 102A, and 102B in the conveyance direction F at a predetermined conveyance speed. The light emitted from the transmission reading light source 24 enters the transmission reading light guide 23 from the incident surface 23a. The incident light is reflected and diffused in the transmission reading light guide 23, or more specifically, the incident light is reflected and diffused by the light diffusing pattern formed on the diffusing surface 23c. The light propagates through the transmission reading light guide 23 while being completely reflected by the reflection surface, and the light is directed to a reading position $O_2$ of the bill S and is emitted from the transmitted light emission surface 23b as representatively indicated by an arrow $L_2$ in FIG. 1. The emitted light is uniformly directed, in a line in the main-scan direction, to one of the surfaces (lower surface) of the bill S.

The directed light transmits through the bill S, and the light is focused on the light receiving element 19 through the rod-lens array 18 of the upper image sensor unit portion 10B. The focused transmitted light is converted to an electric signal by the light receiving element 19 and is processed by a signal processing portion not shown.

In this way, the reflected light of all of the RGB, IR, and UV is read for one scan line, and the reading operation of one scan line in the main-scan direction of the bill S is completed. After the reading operation of one scan line is finished, reading operation of the next one scan line is performed as described above, along with the movement of the bill S in the sub-scan direction. The reading operation of one scan line is repeated while the bill S is conveyed in the conveyance direction F. The entire surface of the bill S is successively scanned, and image information is read based on the reflected light.

The transmission reading illumination portion 12 of the upper image sensor unit portion 10B performs the same operation for the other surface (upper surface).

First Embodiment

Figure 5:
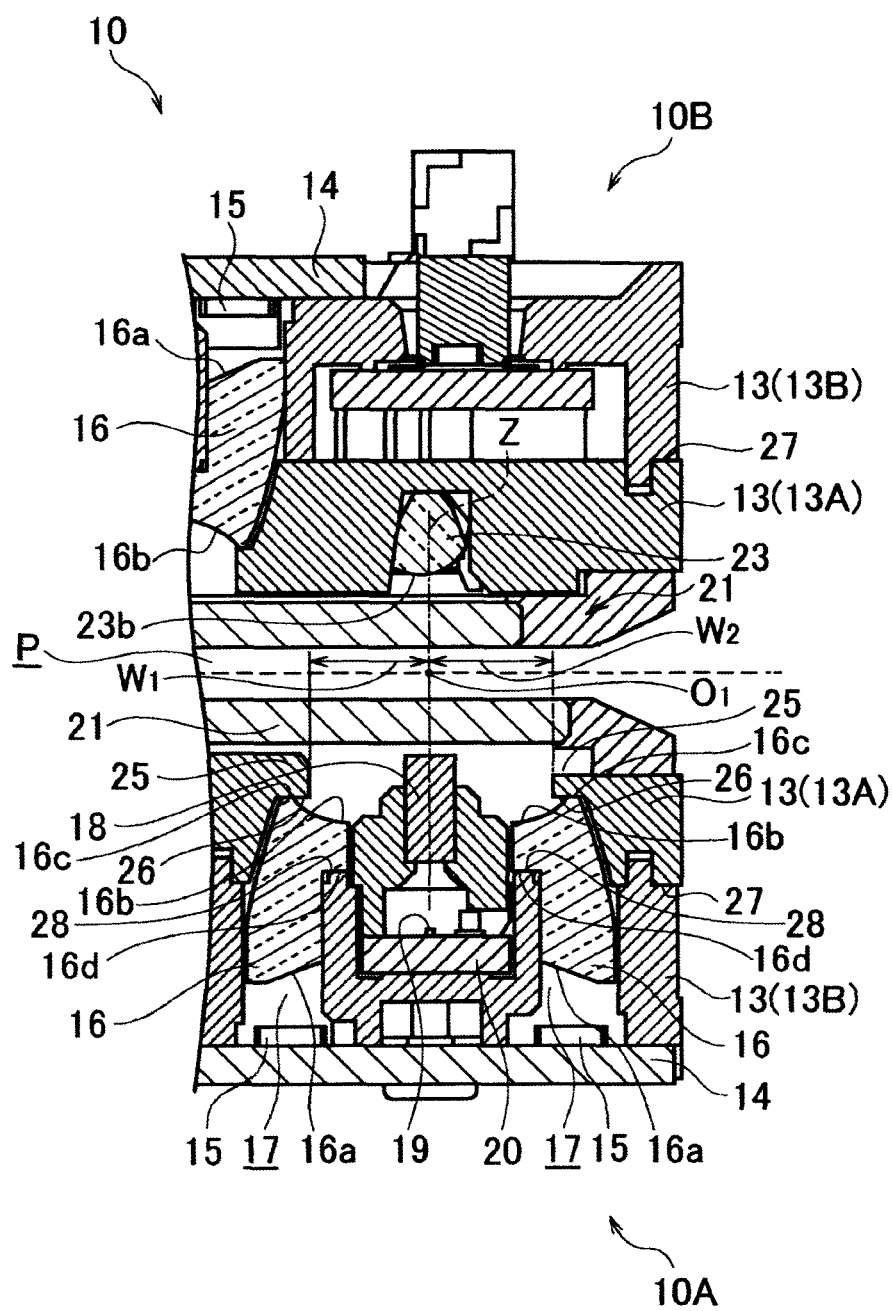
FIG. 5 is a partial sectional view illustrating a configuration example of essential parts in the image sensor unit according to a first embodiment.

FIG. 5 is a partial sectional view illustrating a configuration example of essential parts in the image sensor unit 10 according to a first embodiment.

As illustrated in FIG. 5, a light blocking portion 25 protruding from the reflected light emission surface 16b of the reflection reading light guide 16 toward the optical axis Z of the rod-lens array 18 is provided in part of the housing portion 17, in the upper part of the upper frame 13A. As illustrated in FIG. 5, the light blocking portion 25 protrudes toward the optical axis Z in a shape of eaves to cover part of the reflected light emission surface 16b of the reflection reading light guide 16. More specifically, the light blocking portion 25 and the reflected light emission surface 16b partially overlap as viewed in the vertical direction (Z direction). The amount or length of protrusion of the light blocking portion 25 is set to narrow down the emission range in order to reduce the light directly entering the transmission reading light guide 23 of the upper image sensor unit portion 10B, the light appropriately emitted from the reflection reading light guide 16 to the bill S (arrow $L_1$ illustrated in FIG. 1).

The housing portion 17 that houses the reflection reading light guide 16 is formed in the frame 13. The upper part of the upper frame 13A spreads and opens downward in the sub-scan direction to form part of the housing portion 17. Therefore, the reflection reading light guide 16 can be inserted to the housing portion 17 from below. The reference surface 26 (positioning reference surface) is formed on the light blocking portion 25, and when the reflection reading light guide 16 is inserted from below, the first locking surface 16c of the reflection reading light guide 16 can be abutted with the reference surface 26 to position the reflection reading light guide 16.

According to the configuration, the reflection reading light guides 16 and the light blocking portions 25 are disposed on both sides of the optical axis Z of the rod-lens array 18 in pairs, and slit-like opening portions of predetermined widths (opening widths $W_1$ and $W_2$) are formed between the light blocking portions 25. The opening width W is increased or decreased according to the amount of protrusion of the light blocking portion 25 toward the optical axis Z, and an optimal value is selected in relation to the light blocking efficiency of the light blocking portion 25 (in the present embodiment, W=5.5 mm and $W_2$=5.5 mm).

In the frame 13, the upper frame 13A and the lower frame 13B are overlapped and integrated at a joint surface 27. In the assembly, the reflection reading light guide 16 is inserted to the housing portion 17 from below relative to the upper frame 13A, and the first locking surface 16c arranged on the upper end of the reflection reading light guide 16 is abutted with the reference surface 26. At this point, the members are positioned. The upper frame 13A and the lower frame 13B are combined in the vertical direction, and the stepped portion 28 formed on the lower frame 13B is abutted with the second locking surface 16d. In this way, the reflection reading light guide 16 is attached in the housing portion 17. As a result of the arrangement of the reference surface 26 on the light blocking portion 25, the light blocking effect and the positioning effect can be effectively attained in this part.

In this case, the first locking surface 16c of the reflection reading light guide 16 faces the surface (reference surface 26) facing downward formed on the upper frame 13A. On the other hand, the second locking surface 16d of the reflection reading light guide 16 faces the surface facing the upper side of the stepped portion 28 formed on the lower frame 13B. In this way, the upper frame 13A and the lower frame 13B sandwich the reflected light emission surface 16b to sandwich the reflection reading light guide 16 from both sides to position and hold the reflection reading light guide 16 in the housing portion 17.

According to the structure, the part between the first locking surface 16c and the second locking surface 16d is the fixation end. Therefore, for example, the change in the dimension of the deformation of the reflection reading light guide 16 due to thermal expansion and/or contraction caused by a change in the environmental temperature is generated based on the part between the first locking surface 16c and the second locking surface 16d. More specifically, the influence of the expansion and contraction of the reflection reading light guide 16 can be released toward the incident surface 16a to reduce the influence of the expansion and contraction on the reflected light emission surface 16b close to the fixation end.

An example of a state without the bill S during the reflection reading (for example, a damaged part, such as a gap, scratch, and a tear, between bills when the bills are consecutively read) will be simulated. In this case, the light from the reflection reading illumination portion 11A of the lower image sensor unit portion 10A may directly enter the transmission reading light guide 23 of the transmission reading illumination portion 12 of the upper image sensor unit portion 10B, and the light may be emitted again to the rod-lens array 18 to cause stray light. So-called re-illumination light including the stray light and the like becomes a noise component in the output of the lower image sensor unit portion 10A, and the difference between the output (signal component) when there is the bill S and the noise component caused by the re-illumination light is reduced. If a countermeasure is not taken, a problem may arise wherein the contrast becomes obscure, and the accuracy of the read image is reduced.

The change in the emission range of light caused by the deformation of the reflection reading light guide 16 due to a change in the environmental temperature may cause a problem wherein the generation of the re-illumination light becomes unstable.

In the present embodiment, the lower image sensor unit portion 10A and the upper image sensor unit portion 10B include the image reading portion 11 (reflection reading illumination portion 11A) and the transmission reading illumination portion 12, and both of the transmission type and the reflection type are used.

In the lower image sensor unit portion 10A, the light blocking portion 25 can block part of the light emitted from the reflection reading light guide 16 to the transmission reading light guide 23 of the upper image sensor unit portion 10B to narrow down the emission range of the light of the reflection reading illumination portion 11A. Therefore, the light incident on the transmission reading light guide 23 can be reduced in a state without the bill S at the reading position $O_1$ in the conveyance path P and/or in a state of reading the watermark by the image reading portion 11. This can effectively reduce the influence of the re-illumination light and improve the accuracy of the read image.

Similarly, in the upper image sensor unit portion 10B, the light blocking portion 25 can block part of the light emitted from the reflection reading light guide 16 to the transmission reading light guide 23 of the lower image sensor unit portion 10A to narrow down the emission range of the light of the reflection reading illumination portion 11A. Therefore, the light incident on the transmission reading light guide 23 can be reduced in a state without the bill S at the reading position $O_2$ in the conveyance path P and/or in a state of reading the watermark by the image reading portion 11.

Since the light blocking portion 25 is integrated with the frame 13 (upper frame 13A), a light blocking member does not have to be separately arranged. As a result, there is no manufacturing or assembly cost of the light blocking member, and the structure of the apparatus is simplified. High dimension accuracy of the slits between the light blocking portions 25 can be secured in the fabrication by molding. The insertion from below the reflection reading light guide 16 is enabled during the assembly of the apparatus by dividing the frame 13 into two parts, and the assembly performance can be improved. The light blocking portion 25 serves as the positioning reference surface of the reflection reading light guide 16, and the positioning performance and the like can be improved.

The part between the first locking surface 16c and the second locking surface 16d is the fixation end, and the influence of the expansion and contraction of the reflection reading light guide 16 caused by a change in the environmental temperature or the like can be released toward the incident surface 16a. Therefore, the influence of the deformation can be reduced in the reflected light emission surface 16b, and the change in the reflected light emission surface 16b can be reduced. Therefore, the emission range of light can be stabilized even if there is a change in the environmental temperature. The light blocking effect of the light blocking portion 25 can be effectively attained, and the re-illumination light can be effectively reduced.

Second Embodiment

Figure 6:
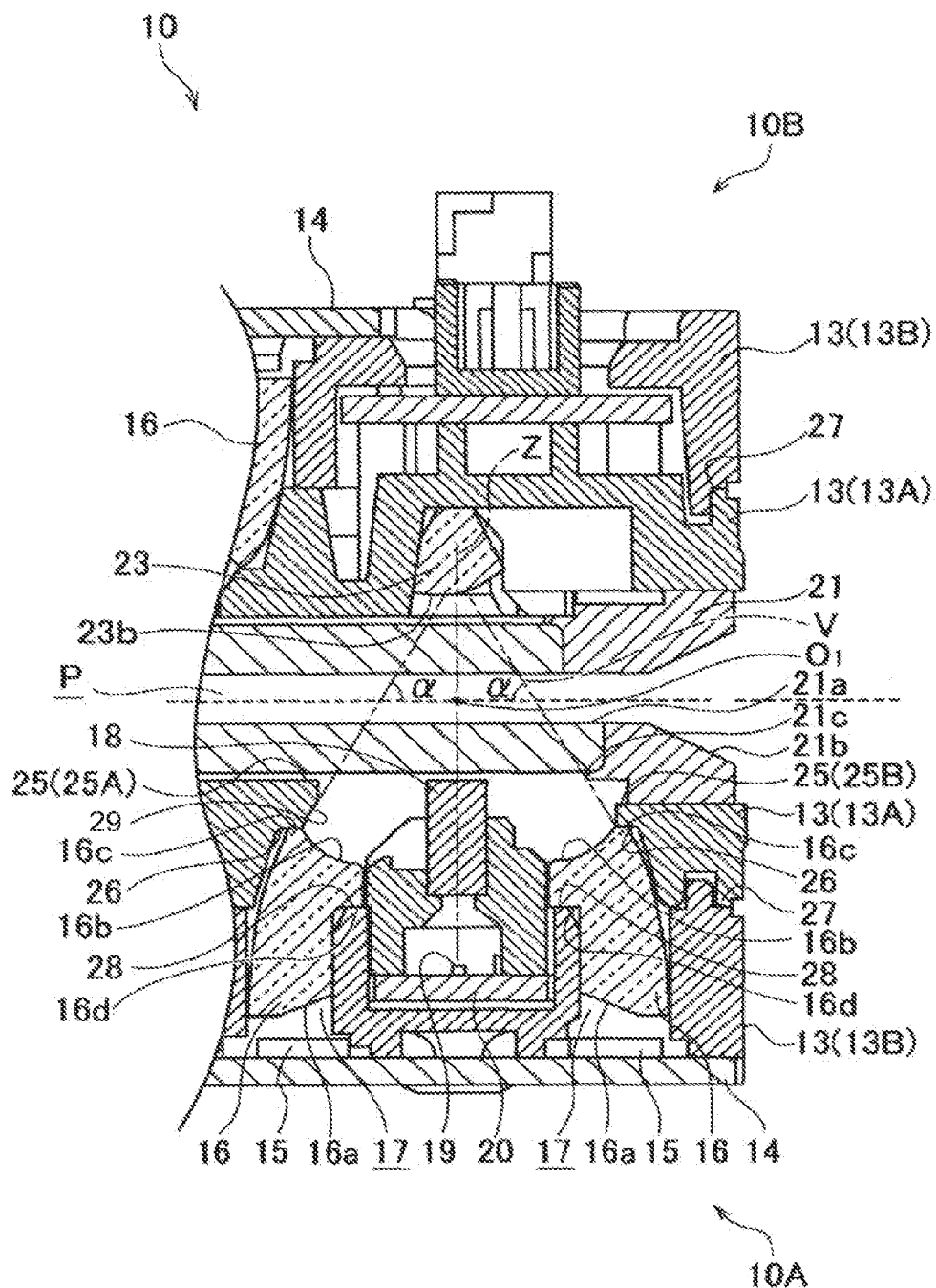
FIG. 6 is a partial sectional view illustrating a configuration example of essential parts in the image sensor unit according to a second embodiment.

FIG. 6 is a partial sectional view illustrating a configuration example of essential parts in the image sensor unit 10 according to a second embodiment. Members with the same functions as in the first embodiment will be designated with the same reference numerals, and the description will not be repeated.

As illustrated in FIG. 6, the light blocking portion 25 protruding from the reflected light emission surface 16b of the reflection reading light guide 16 toward the optical axis Z of the rod-lens array 18 is provided in part of the housing portion 17, in the upper part of the upper frame 13A.

In the present embodiment, the amount of protrusion and the shape are different between the left and right light blocking portions 25 as illustrated in FIG. 6 (left side will be called a light blocking portion 25A, and right side will be called a light blocking portion 25B). The light blocking portion 25A protrudes toward the optical axis Z in a shape of eaves to cover part of the reflected light emission surface 16b of the reflection reading light guide 16 on the left side. On the other hand, the light blocking portion 25B does not reach the reflected light emission surface 16b of the reflection reading light guide 16, and the light blocking portion 25B protrudes toward the optical axis Z in a shape of eaves to cover the first locking surface 16c. An inclined portion 29 (in the present embodiment, inclination angle α=about 60°) is formed in the lower part of the light blocking portion 25A. The inclined portion 29 can narrow down the emission range without reducing the illuminance of light emitted from the reflected light emission surface 16b. On the side of the light blocking portion 25B, a straight line (virtual line V illustrated in FIG. 6) connecting the tip of the light blocking portion 25B and the outer frame 21b of the cover 21 (supporting portion 21c supporting the cover main body 21a) is formed at the same inclination angle as the inclination angle of the inclined portion 29 of the light blocking portion 25A. Therefore, on the side of the light blocking portion 25B, the light blocking portion 25B and the outer frame 21b of the cover 21 can narrow down the emission range without reducing the illuminance of light emitted from the reflected light emission surface 16b.

As in the light blocking portion 25A, the inclined portion 29 may be formed in the light blocking portion 25B. More specifically, the light blocking portion 25B may include the inclined portion to be symmetrical with the light blocking portion 25A relative to the optical axis Z. As in the first embodiment, the reference surface 26 abutted with the first locking surface 16c of the reflection reading light guide 16 is formed on the light blocking portions 25A and 25B.

Next, a verification result of the effects of the first and second embodiments of the present invention will be described with reference to FIGS. 7A to 7C. The members with the same functions as in the embodiments are designated with the same reference numerals, and the description will not be repeated.

Figure 7A:
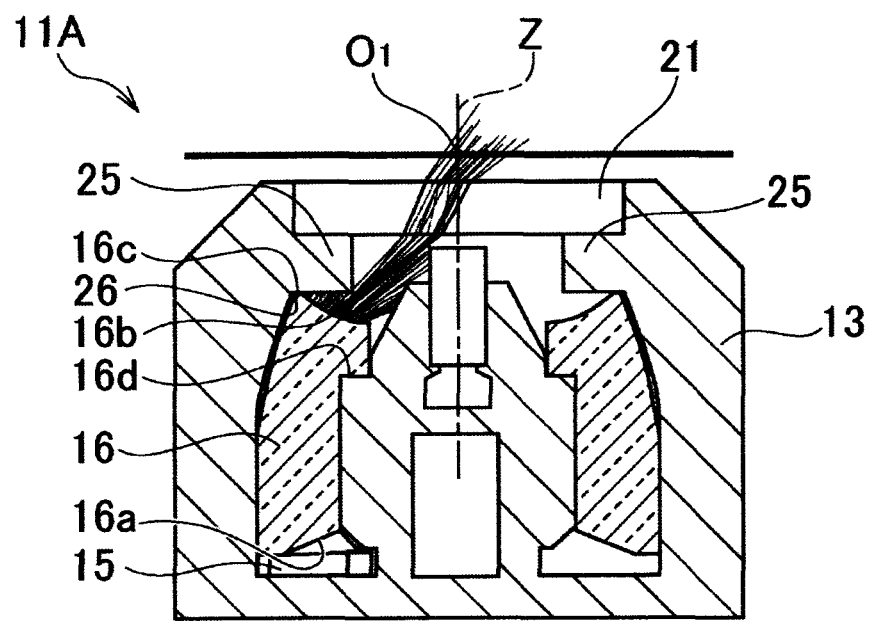
FIG. 7A is a diagram illustrating a simulation of a state of light from a reflection reading illumination portion according to the first embodiment.
Figure 7B:
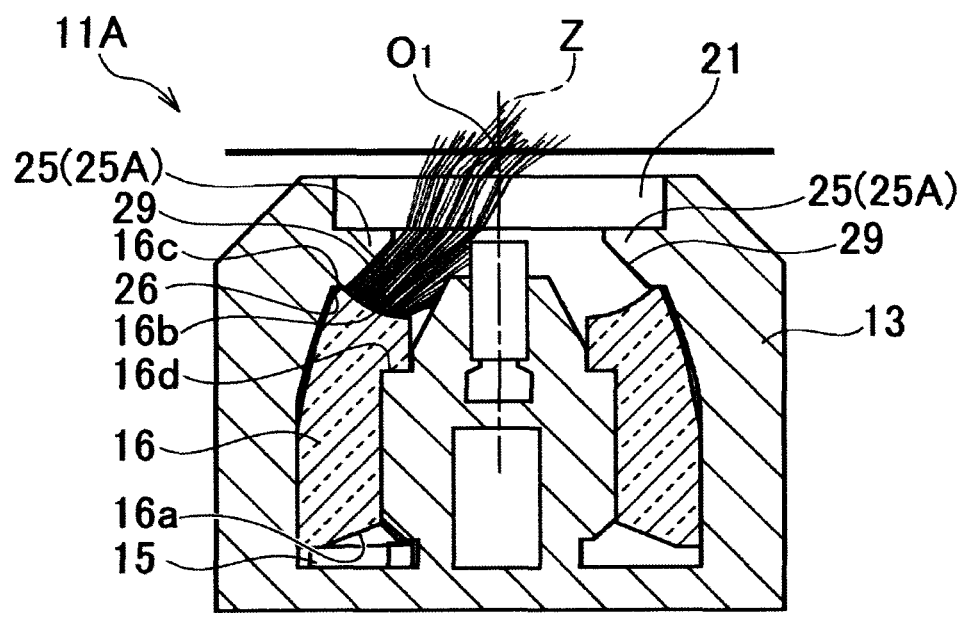
FIG. 7B is a diagram illustrating a simulation of a state of light from the reflection reading illumination portion according to the second embodiment.
Figure 7C:
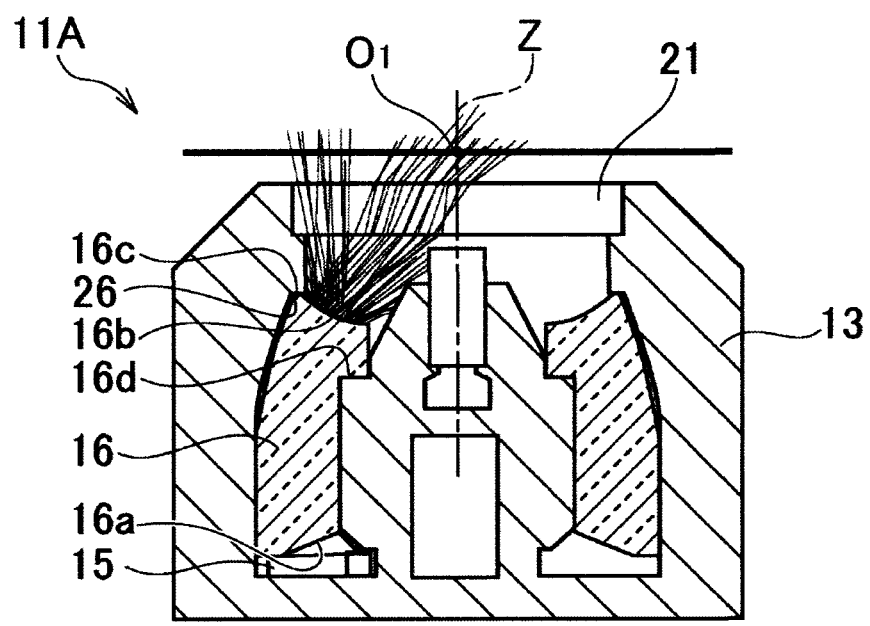
FIG. 7C is a diagram illustrating a simulation of a state of light from the reflection reading illumination portion according to a comparative example.

FIGS. 7A to 7C are sectional views illustrating configurations of essential parts of the reflection reading illumination portion 11A, corresponding to the first embodiment, the second embodiment, and a comparative example, respectively. FIGS. 7A to 7C illustrate simulations of the state of light from the reflection reading illumination portion 11A of one side (left side). A solid line extending from the reflection reading light guide 16 of each of FIGS. 7A to 7C is a trace of light emitted from the reflection reading light source 15, entered in the reflection reading light guide 16, and emitted from the reflected light emission surface 16b. The solid line actually is a luminous flux.

FIG. 7A illustrates the reflection reading illumination portion 11A including the light blocking portion 25 of the first embodiment. FIG. 7B illustrates the reflection reading illumination portion 11A including the light blocking portion 25A provided with the inclined portion 29 in the light blocking portion 25 of the second embodiment. FIG. 7C illustrates the reflection reading illumination portion 11A without the light blocking portion 25, including only the reference surface 26.

The light blocking portion 25 is not included in the comparative example illustrated in FIG. 7C. Therefore, the emission range of the light from the reflected light emission surface 16b cannot be narrowed down, and the light is emitted to a position away from the reading position $O_1$ in the sub-scan direction. On the other hand, in the first and second embodiments illustrated in FIGS. 7A and 7B, the light blocking portions 25 and 25A can narrow down the emission range of the light from the reflected light emission surface 16b to guide the light around the reading position $O_1$.

The following Table 1 indicates illuminance values of the reflection reading illumination portion 11A on one side (left side) at the reading position $O_1$ in the first embodiment, the second embodiment, and the comparative example.

TABLE 1

|  | First Embodiment | Second Embodiment | Comparative Example |
|---|---|---|---|
| Illuminance Value ($\mu W/mm^2$) | $3.3 \times 10^{-3}$ | $8.6 \times 10^{-3}$ | $8.6 \times 10^{-3}$ |

As illustrated in Table 1, the illuminance values of the comparative example and the second embodiment are about the same, and compared to these, the illuminance value of the first embodiment is smaller. This indicates that the emission efficiency and the change in the emission range (re-illumination light increases or decreases with an increase or decrease in the light entering the transmission reading light guide 23 due to an increase or decrease in the emission range) are in a trade-off relationship. As a result, the inclination angle of the inclined portion 29 can be appropriately set based on the relationship between the emission efficiency at the reading position $O_1$ ($O_2$) and the re-illumination light caused by the change in the emission range.

Although the preferred embodiments of the present invention have been described, the present invention is not limited to the embodiments, and various modifications and changes can be made within the scope of the present invention.

Although the example of disposing the pairs of the reflection reading light guide 16 and the light blocking portion 25 on both sides of the optical axis Z of the rod-lens array 18 has been described in the embodiments, the reflection reading light guide 16 and the light blocking portion 25 may be arranged only on one side.

Although the example that the transmission reading light guide 23 in the transmission reading illumination portion 12 is on the optical axis Z of the rod-lens array 18 has been described, the transmission reading light guide 23 can be arranged diagonally to the optical axis Z of the rod-lens array 18 as long as the transmission reading light can be emitted to the reading position $O_1$ ($O_2$).

The transmission reading light source 24 may be disposed not only on one of the end surfaces of the transmission reading light guide 23 in the longitudinal direction, but may also be disposed on both ends.

Although the reflection reading illumination portion 11A includes pairs of the reflection reading light source 15 and the reflection reading light guide 16 across the optical axis Z of the rod-lens array 18, the reflection reading illumination portion 11A may include only one set of the reflection reading light source 15 and the reflection reading light guide 16.

Although the image reading apparatus 100 is a sheet-feed type image reading apparatus in the description, a flat-bed type image reading apparatus can also be applied.

INDUSTRIAL APPLICABILITY

The image sensor unit of the present invention is effectively used as an image reading apparatus, such as a copying machine, an image scanner, and a facsimile.

The invention claimed is:

1. An image sensor unit that emits light to an object to be illuminated and that reads reflected light from the object to be illuminated and/or transmitted light transmitted through the object to be illuminated, the image sensor unit comprising:
   a reflection reading light guide that emits light of a reflection reading light source, from an emission surface to the object to be illuminated;
   a transmission reading light guide that emits light of a transmission reading light source, from an emission surface to the object to be illuminated;
   an imaging element that focuses the reflected light from the object to be illuminated and/or the transmitted light transmitted through the object to be illuminated;
   a light receiving element that receives the light from the imaging element; and
   a frame comprising a housing portion housing the reflection reading light guide, wherein
   the reflection reading light guide comprises a first locking portion abutted with the frame, on a side away from an optical axis of the imaging element, near the emission surface of the reflection reading light guide,
   the frame comprises a light blocking portion that is abutted with the first locking portion and that covers part of the emission surface of the reflection reading light guide,
   the reflection reading light guide comprises a second locking portion opposing the emission surface of the reflection reading light guide and abutted with the frame, on a side close to the optical axis,
   the frame comprises a stepped portion abutted with the second locking portion, and
   the light blocking portion and the stepped portion sandwich the reflection reading light guide to position the reflection reading light guide.

2. The image sensor unit according to claim 1, wherein an upper part of the frame as part of the housing portion spreads and opens below, the reflection reading light guide being insertable to the housing portion from below.

3. The image sensor unit according to claim 1, wherein the frame is divided into an upper frame comprising the light blocking portion in the housing portion and a lower frame comprising the stepped portion in the housing portion.

4. The image sensor unit according to claim 1, wherein reflection reading light guides and light blocking portions are disposed on both sides of the optical axis of the imaging element, and slit-like opening portions with a predetermined width are formed between the light blocking portions.

5. The image sensor unit according to claim 1, wherein an inclined portion is formed in a lower part of the light blocking portion.

6. An image reading apparatus comprising an image sensor unit that emits light to an object to be illuminated and that reads reflected light from the object to be illuminated and/or transmitted light transmitted through the object to be illuminated, the image sensor unit comprising:
- a reflection reading light guide that emits light of a reflection reading light source, from an emission surface to the object to be illuminated;
- a transmission reading light guide that emits light of a transmission reading light source, from an emission surface to the object to be illuminated;
- an imaging element that focuses the reflected light from the object to be illuminated and/or the transmitted light transmitted through the object to be illuminated;
- a light receiving element that receives the light from the imaging element; and
- a frame comprising a housing portion housing the reflection reading light guide, wherein
  - the reflection reading light guide comprises a first locking portion abutted with the frame, on a side away from an optical axis of the imaging element, near the emission surface of the reflection reading light guide,
  - the frame comprises a light blocking portion that is abutted with the first locking portion and that covers part of the emission surface of the reflection reading light guide,
  - the reflection reading light guide comprises a second locking portion opposing the emission surface of the reflection reading light guide and abutted with the frame, on a side close to the optical axis,
  - the frame comprises a stepped portion abutted with the second locking portion,
  - the light blocking portion and the stepped portion sandwich the reflection reading light guide to position the reflection reading light guide, and
  - the image sensor unit reads an image of the object to be illuminated while the object to be illuminated and the image sensor unit are relatively moved.

7. The image reading apparatus according to claim 6, wherein an upper part of the frame as part of the housing portion spreads and opens below, the reflection reading light guide being insertable to the housing portion from below.

8. The image reading apparatus according to claim 6, wherein the frame is divided into an upper frame comprising the light blocking portion in the housing portion and a lower frame comprising the stepped portion in the housing portion.

9. The image reading apparatus according to claim 6, wherein reflection reading light guides and light blocking portions are disposed on both sides of the optical axis of the imaging element, and slit-like opening portions with a predetermined width are formed between the light blocking portions.

10. The image reading apparatus according to claim 6, wherein an inclined portion is formed in a lower part of the light blocking portion.

* * * * *